United States Patent
Kondo (10) Patent No.: US 9,798,124 B2
(45) Date of Patent: Oct. 24, 2017

(54) IMAGE DISPLAY APPARATUS AND IMAGE CAPTURING APPARATUS

(71) Applicant: CANON KABUSHIKI KAISHA, Tokyo (JP)

(72) Inventor: Ryoji Kondo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/213,678

(22) Filed: Jul. 19, 2016

(65) Prior Publication Data

US 2017/0023782 A1    Jan. 26, 2017

(30) Foreign Application Priority Data

Jul. 23, 2015 (JP) ................. 2015-145890

(51) Int. Cl.
*G02B 17/08* (2006.01)
*G02B 5/13* (2006.01)
*G06F 3/01* (2006.01)
*H04N 5/374* (2011.01)
*G02B 27/01* (2006.01)

(52) U.S. Cl.
CPC .......... *G02B 17/0856* (2013.01); *G02B 5/13* (2013.01); *G02B 17/086* (2013.01); *G02B 17/0848* (2013.01); *G02B 27/0172* (2013.01); *G06F 3/011* (2013.01); *H04N 5/374* (2013.01)

(58) Field of Classification Search
CPC ................... G02B 5/136; G02B 5/13; G02B 17/08–17/086
USPC ........ 359/642, 708–718, 726–732, 741, 796, 359/797, 834
See application file for complete search history.

(56) References Cited

U.S. PATENT DOCUMENTS

| 6,222,676 B1 | 4/2001 | Togino et al. |
| 6,510,006 B1 * | 1/2003 | Togino ............... A61B 1/00163 348/65 |

FOREIGN PATENT DOCUMENTS

| JP | 10153748 A | 6/1998 |
| JP | 2000105338 A | 4/2000 |
| JP | 2000227554 A | 8/2000 |

OTHER PUBLICATIONS

Extended European Search Report issued in European Appln. No. 16001598.8, dated Nov. 24, 2016.
(Continued)

*Primary Examiner* — Darryl J Collins
(74) *Attorney, Agent, or Firm* — Rossi, Kimms & McDowell LLP (57) ABSTRACT

The image display apparatus includes an optical system causing a light flux entering from an original image by being transmitted through a fifth surface to reflect at a fourth surface, a third surface, a first surface and a second surface and then cause the light flux to be transmitted through the first surface and exit toward an exit pupil, causing the light flux to form an intermediate image and causing optical paths to intersect with each other. The optical system satisfies $0.62 \leq L12/f \leq 5.00$ and $1.80 \leq L45/L12 \leq 5.00$. When a distance between hit points of a central-view-angle principal ray on the surfaces is referred to as a hit point distance, L45 represents a hit point distance between the fourth and fifth surfaces, L12 represents a hit point distance between the first and second surfaces, and f represents a focal length of the optical system.

7 Claims, 6 Drawing Sheets

(56) References Cited

OTHER PUBLICATIONS

Office Action issued in Japanese Patent Application No. 2015-145890 dated Jun. 6, 2017.

* cited by examiner

IMAGE DISPLAY APPARATUS AND IMAGE CAPTURING APPARATUS

BACKGROUND OF THE INVENTION

Field of the Invention

The present invention relates to image display apparatuses such as a head-mounted display (HMD) and a projector and relates to image capturing apparatuses such as a video camera and a still camera.

Description of the Related Art

Image display apparatuses each having a display optical system that magnifies an original image formed on an image forming element such as a liquid crystal element and presenting a magnified observation image to an observer and image capturing apparatuses each capturing an object image through an image sensor such as a CMOS sensor are desirable to be compact and have a wide angle of view. Japanese Patent Laid-Open Nos. 10-153748 and 2000-105338 each disclose an image display apparatus using as a display optical system an eccentric prism whose reflective surfaces having optical powers are eccentrically arranged.

Realizing a compact image display apparatus and a compact image capturing apparatus each having a wide angle of view requires increasing a magnification of their optical system by forming an intermediate image inside the optical system. The image display apparatus disclosed in Japanese Patent Laid-Open No. 2000-105338 forms an intermediate image inside one eccentric prism.

However, the image display apparatus disclosed in Japanese Patent Laid-Open No. 2000-105338 only provides an insufficiently wide angle of view (horizontal and vertical angels of view are respectively about 30° and about 23°), and therefore it is desirable to increase the angle of view while preventing an increase in size of the optical system (eccentric prism). Moreover, a presented image and a captured image are necessary to be high quality images that have no image lack and whose aberration is sufficiently corrected.

SUMMARY OF THE INVENTION

The present invention provides an image display apparatus capable of presenting a high quality observation image and an image capturing apparatus capable of providing a high quality captured image.

The present invention provides as an aspect thereof an image display apparatus including an image forming element configured to form an original image, and a display optical system formed by an optical element whose inside surrounded by optical surfaces including a first surface, a second surface, a third surface, a fourth surface and a fifth surface is filled with an optical medium and configured to introduce a light flux from the original image to an exit pupil. The display optical system is configured to cause the light flux entering from the original image by being transmitted through the fifth surface to reflect at the fourth surface, the third surface, the first surface and the second surface in this order and then cause the light flux to be transmitted through the first surface and exit toward the exit pupil and to cause the light flux to form an intermediate image inside the display optical system, and to cause at least part of an optical path of the light flux proceeding from the fifth surface to the fourth surface to intersect with at least part of an optical path of the light flux proceeding from the third surface to the first surface. The display optical system satisfies the following conditions:

$$0.62 \leq L12/f \leq 5.00$$

$$1.80 \leq L45/L12 \leq 5.00$$

where, when a ray emitted from a center of an image forming area of the image forming element in which the original image is formed and passing through a center of the exit pupil is referred to as a central-view-angle principal ray, and a distance between hit points of the central-view-angle principal ray on the optical surfaces is referred to as a hit point distance, L45 represents a hit point distance between the fourth and fifth surfaces, L12 represents a hit point distance between the first and second surfaces, and f represents a focal length of the display optical system.

The present invention provides as another aspect thereof an image capturing apparatus including an image sensor configured to capture an optical image of an object, and an image capturing optical system formed by an optical element whose inside surrounded by optical surfaces including a first surface, a second surface, a third surface, a fourth surface and a fifth surface is filled with an optical medium and configured to image a light flux from the object to form the optical image on the image sensor. The image capturing optical system is configured to cause the light flux entering from the object by being transmitted through the first surface to reflect at the second surface, the first surface, the third surface and the fourth surface in this order and then cause the light flux to be transmitted through the fifth surface and exit toward the image sensor, to cause the light flux to form an intermediate image inside the image capturing optical system and to cause at least part of an optical path of the light flux proceeding from the first surface to the third surface to intersect with at least part of an optical path of the light flux proceeding from the fourth surface to the fifth surface. The image capturing optical system satisfies the following conditions:

$$0.62 \leq L12/f \leq 5.00$$

$$1.80 \leq L45/L12 \leq 5.00$$

where, when a ray passing through a center of an entrance pupil and reaching a center of an image capturing area of the image sensor is referred to as a central-view-angle principal ray, and a distance between hit points of the central-view-angle principal ray on the optical surfaces is referred to as a hit point distance, L45 represents a hit point distance between the fourth and fifth surfaces, L12 represents a hit point distance between the first and second surfaces, and f represents a focal length of the image capturing optical system.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

[Embodiment 1]

First, description will be made of an image display apparatus such as an HMD or a projector, which is a first embodiment (Embodiment 1) of the present invention, and thereafter description will be made of specific numerical examples of the image display apparatus. A coordinate system illustrated in the drawings has a z-axis extending in a paper surface of each drawing in a visual axis direction of an observer, a y-axis extending in the paper surface of each drawing in a direction orthogonal to the z-axis and an x-axis extending in a direction orthogonal to the z- and y-axes (that is, to the paper surface of each drawing).

Figure 1:
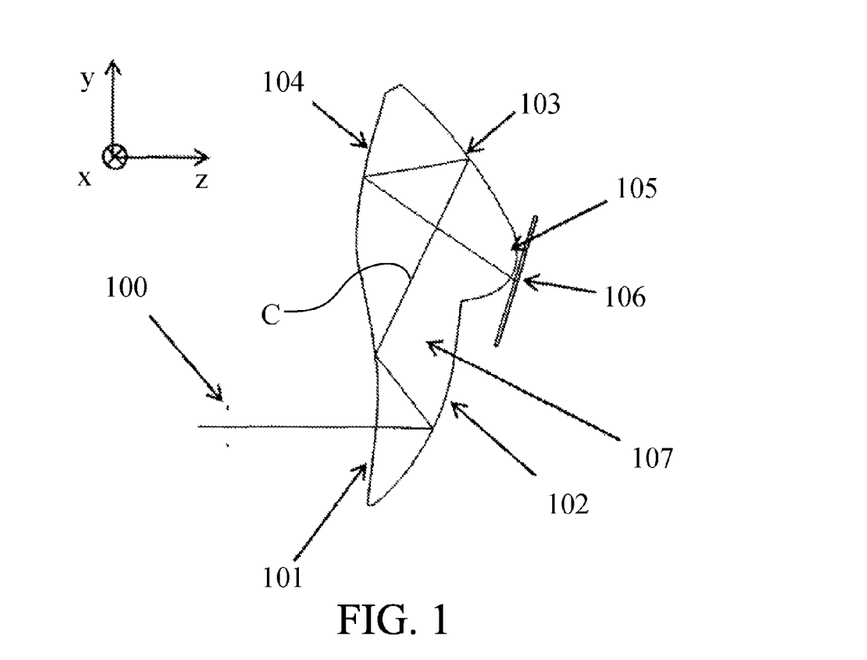
FIG. 1 illustrates a configuration of an image display apparatus that is Embodiment 1 of the present invention and a central-view-angle principal ray therein.
Figure 2:
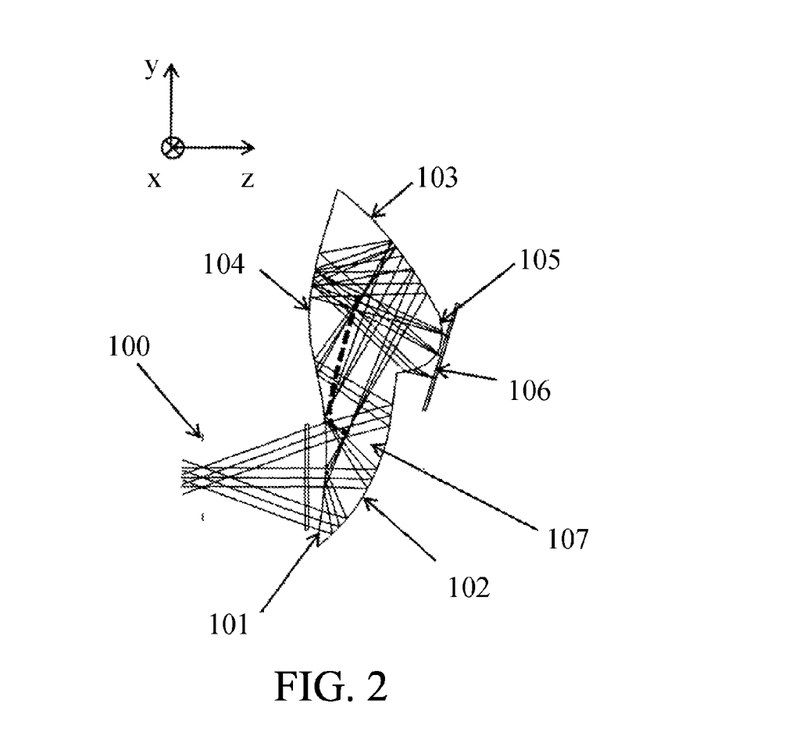
FIG. 2 illustrates a light flux and an intermediate image in the image display apparatus of Embodiment 1.

FIGS. 1 and 2 illustrate a configuration of the image display apparatus of Embodiment 1. FIG. 1 illustrates a central-view-angle principal ray C proceeding in the image display apparatus; the central-view-angle principal ray C will be described later. FIG. 2 illustrates a flux of rays (hereinafter referred to as "a light flux") proceeding in the image display apparatus.

In FIGS. 1 and 2, reference numeral 106 denotes an image forming element (image display element) such as a liquid crystal element (LCD) or an organic electro luminescence (EL) element. The image forming element 106 forms an original image.

Reference numeral 107 denotes a display optical system having as optical surfaces a first surface 101, a second surface 102, a third surface 103, a fourth surface 104 and a fifth surface 105. The first surface 101 serves as a reflective surface and a transmissive surface. The second surface 102 serves as a reflective surface, and the third surface 103 serves as a reflective surface. The fourth surface 104 serves as a reflective surface, and the fifth surface 105 serves as a transmissive surface. The display optical system 107 is formed by one prism (optical element) whose inside surrounded by the first to fifth surfaces 101 to 105 is filled with an optical medium such as glass or plastic.

The second, third and fourth surfaces 102, 103 and 104 that are reflective surfaces in the prism are each provided with a high-reflectance reflective film formed by metal deposition or the like.

In an optical system like the display optical system 107 in this embodiment using multiple reflective surfaces mutually eccentric, folding an optical path enables making the entire optical system compact. However, each reflective surface has a higher sensitivity to an eccentric error than that of a refractive surface, so that a highly accurate position adjustment (assembling adjustment) for adjusting relative positional relations of the reflective surfaces is required. In contrast, forming the optical system having an optical power as one prism like this embodiment can eliminate such an assembling adjustment.

Reference numeral 100 denotes an exit pupil of the display optical system 107. An observer placing his/her eye at a position of the exit pupil 100 can observe a presented image (observation image) that is a magnified image of the original image formed on the image forming element 106.

In the image display apparatus configured as above, the light flux emitted from the original image on the image forming element 106 and including the central-view-angle principal ray C is transmitted through the fifth surface 105 to enter the display optical system 107. The central-view-angle principal ray C is a ray emitted from a center of an original image forming area of the image forming element 106 in which the original image is formed and passing through a center of the exit pupil 100.

The light flux entering the display optical system 107 from the fifth surface 105 is reflected by the fourth surface 104, the third surface 103, the first surface 101 and the second surface 102 in this order, is transmitted through the first surface 101 to exit from the display optical system 107 and then reaches the exit pupil 100. The reflection at the first surface 101 is internal total reflection.

Although this embodiment describes a case where the first surface 101 serves as reflective and transmissive surfaces by utilizing internal total reflection that increases light utilization efficiency, the first surface 101 may serve as reflective and transmissive surfaces by using a half-transmissive film.

Furthermore, the display optical system 107 in this embodiment causes at least part of an optical path of the light flux proceeding from the fifth surface 105 to the fourth surface 104 to intersect with at least part of an optical path of the light flux proceeding from the third surface 103 to the first surface 101. This intersection of the optical paths enables reducing a size of the entire display optical system 107 while providing a required optical path length.

Moreover, as illustrated in FIG. 2, the display optical system 107 causes the light flux from the original image to form thereinside an intermediate image (illustrated by a broken line). In FIG. 2, of the first to fifth surfaces 101 to 105, the fifth, fourth and third surfaces 105, 104 and 103 near the image forming element 106 cause the light flux to form the intermediate image. The display optical system 107 introduces the light flux from the intermediate image to the exit pupil 100 by the second and first surfaces 102 and 101.

The display optical system 107 forming such an intermediate image thereinside enables increasing a freedom degree of setting of a display angle of view with respect to a size of the image forming element 106 (that is, of the original image forming area).

Furthermore, the display optical system 107 can be divided in terms of optical functions into a relay optical system that forms the intermediate image and is constituted by the fifth, fourth and third surfaces 105, 104 and 103 and an observation optical system that forms a virtual image of the intermediate image and is constituted by the second and first surfaces 102 and 101. This division enables decreasing an optical power of the observation optical system while increasing the angle of view, which enables reducing an optical power burden on the observation optical system, in particular, that of the second surface 102 having a positive optical power. Consequently, the display optical system 107 can easily provide a sufficient eye relief, which is a distance between the eye of the observer and the display optical system 107, and therefore can realize an image display apparatus enabling a comfortable image observation with a wide angle of view.

In addition, as illustrated in FIG. 2, the relay optical system forms the intermediate image so as to cancel out aberrations such as field curvature generated in the observation optical system, which reduces a burden of aberration correction on the observation optical system and thereby can realize an image display apparatus capable of presenting a high quality observation image whose aberrations are sufficiently corrected. When one prism whose multiple optical surfaces have optical powers forms an intermediate image thereinside, a small number of times of reflections of a light flux inside the prism increases an optical power burden on each optical element, which makes it difficult to correct aberrations. Thus, it is necessary to reflect the light flux three or more times. The display optical system 107 in this embodiment reflects the light flux four or more times and thus enables presenting an observation image whose aberrations are sufficiently corrected.

Figure 3:
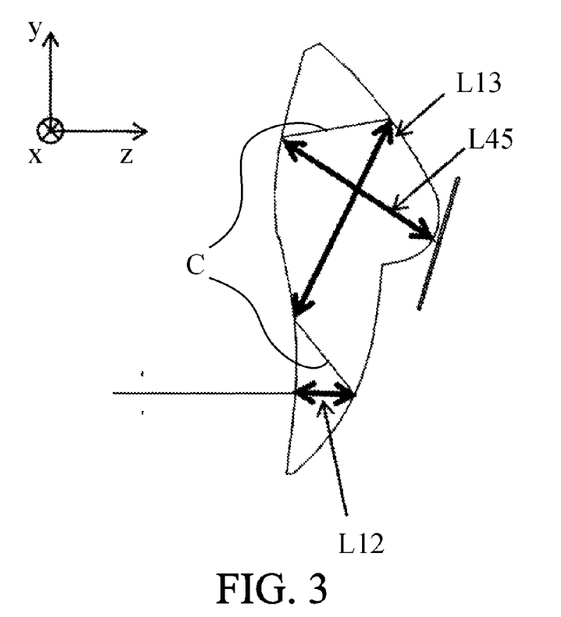
FIG. 3 illustrates hit point distances between optical surfaces in the image display apparatus of Embodiment 1.

The display optical system 107 in this embodiment is configured to satisfy the following conditions. FIG. 3 illustrates hit point distances L12, L13 and L45 used in the conditions. A distance between hit points of the central-view-angle principal ray C on two surfaces of the optical surfaces (first to fifth surfaces 101 to 105) is referred to as "a hit point distance" between the two surfaces. In FIG. 3, the hit point distance L12 represents one between the first and second surfaces 101 and 102, the hit point distance L13 represents one between the first and third surfaces 101 and 103, and the hit point distance L45 represents one between the fourth and fifth surfaces 104 and 105.

First, the hit point distances L12 and L45 satisfy conditions expressed by following expressions (1) and (2).

$$0.62 \leq L12/f \leq 5.00 \quad (1)$$

$$1.80 \leq L45/L12 \leq 5.00 \quad (2)$$

In the condition of expression (1), a value of L12/f equal to or larger than the lower limit is necessary as a condition in order that the light flux reflected by the first surface 101 be reflected by the second surface 102 in the prism as the display optical system 107 providing a wide angle of view. Not satisfying this condition generates vignetting of the light flux (in other words, an image lack) or excessively thins a portion of the prism between the first and second surfaces 101 and 102 to decrease a mechanical strength of this portion. On the other hand, a higher value of L12/f than the upper limit of the condition of expression (1) excessively increases an optical effective area of the second surface 102, which results in an increase in size of the relay optical system and thereby makes it difficult to make the entire display optical system 107 compact.

In the condition of expression (2), a value of L45/L12 equal to or larger than the lower limit is necessary as a condition in order that the light flux necessary for image display propagate in the above-described order in the display optical system 107 providing a wide angle of view and satisfying the condition of expression (1). Not satisfying this condition of expression (2) generates vignetting of the light flux, which makes it difficult to present a good observation image including no image lack. Furthermore, not satisfying the condition of expression (2) makes it difficult to provide a necessary optical path length of the relay optical system forming the intermediate image, which results in an increase in optical power burden on each optical element and thereby makes it difficult to correct aberrations sufficiently. On the other hand, a higher value of L45/L12 than the upper limit of the condition of expression (2) excessively increases an optical effective area of the fourth surface 104, which results in an increase in size of the relay optical system and thereby makes it difficult to make the entire display optical system 107 compact.

It is desirable to change at least one of the conditions of expressions (1) and (2) to a condition expressed by following expression (3) or a condition expressed by following expression (4).

$$0.70 \leq L12/f \leq 3.00 \quad (3)$$

$$2.00 \leq L45/L12 \leq 4.00 \quad (4)$$

Satisfying at least one of the conditions of expressions (3) and (4) enables realizing a well-balanced image display apparatus, while being compact as a whole, that can provide a sufficient space in the prism and that can present a good observation image whose aberrations are sufficiently corrected.

Furthermore, the display optical system 107 (hit point distances L13 and L45) is desirable to satisfy, in addition to the conditions of expressions (1) (or (3)) and (2) (or (4)), a condition expressed by following expression (5).

$$0.48 \leq L45/L13 \leq 5.00 \quad (5)$$

Satisfying the condition of expression (5) enables realizing a display optical system whose relay and observation optical systems are well-balanced in size and that effectively utilizes the space in the prism, which enables realizing a compact image display apparatus capable of presenting a good observation image. A lower value of L45/L13 than the lower limit of the condition of expression (5) makes the relay and observation optical systems excessively distant from each other, which increases the size of the display optical system 107 in spite of folding the optical path. Furthermore, the lower value of L45/L13 than the lower limit of the condition of expression (5) excessively spreads the light flux proceeding toward the observation optical system, which makes it difficult to make the observation optical system compact and thus makes it difficult to make the entire display optical system 107 compact. On the other hand, a higher value of L45/L13 than the upper limit of the condition of expression (5) excessively increases the optical effective area of the fourth surface 104, which makes it difficult to make the entire display optical system 107 compact.

It is more desirable to change the condition of expression (5) to a condition expressed by following expression (6).

$$0.60 \leq L45/L13 \leq 3.00 \quad (6)$$

Satisfying the condition of expression (6) enables realizing a display optical system whose relay and observation optical systems are further well-balanced in size and that further effectively utilizes the space in the prism, which realizing a further compact image display apparatus capable of presenting a good observation image.

The above-described embodiment enables realizing a compact image display apparatus that provides a wider angle of view than those of conventional ones and that is capable of presenting a high quality observation image. For example, the image display apparatus of this embodiment enables providing a horizontal angle of view of 50° or larger (more desirably, 57° or larger) and a vertical angle of view of 30° or larger (more desirably, 37° or larger).

Next, description will be made of numerical examples according to the above-described embodiment.

NUMERICAL EXAMPLE 1

Figure 4:
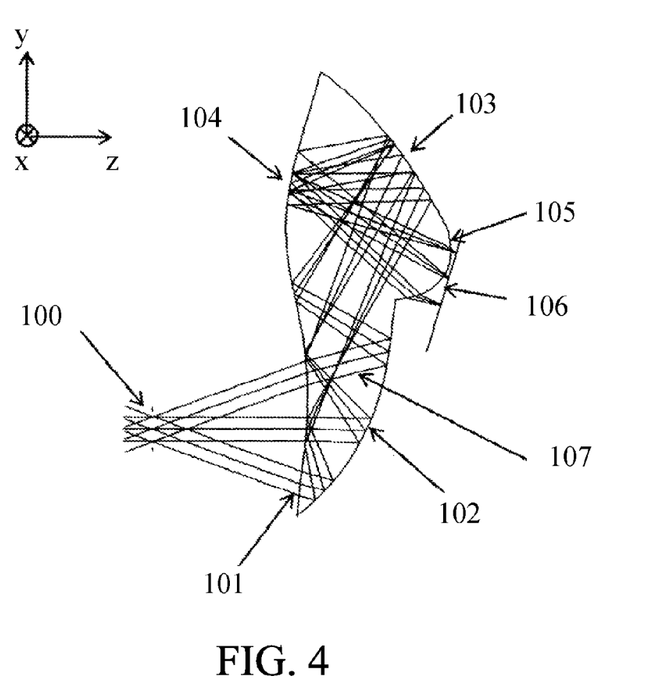
FIG. 4 illustrates an image display apparatus that is Numerical Example 1.

Table 1A shows optical data of Numerical Example 1, and FIG. 4 illustrates a sectional view of an optical path of this numerical example. In this numerical example, the image forming element 106 has a size of 18.4 mm×11.5 mm. The exit pupil 100 of the display optical system 107 has a horizontal diameter of about 7.6 mm and a vertical diameter of about 5.2 mm. The center of the exit pupil 100 is set at a rotational center position of an eyeball of an observer. The focal length of the display optical system 107 is about 16 mm. The display optical system 107 provides a horizontal angle of view of 60° and a vertical angle of view of 40° and displays an observation image at an infinite distance in a positive z-axis direction.

In the optical data shown in Table 1A, surface numbers S are given to optical surfaces in order in a direction from the virtual image toward an object as the image forming element 106, that is, in so-called a reverse ray tracing direction. Reference character S1 denotes a stop surface (exit pupil 100), and SI an original image forming surface (original image forming area) of the image forming element 106. In this numerical example, the optical surfaces S2 to S7 are rotationally asymmetric surfaces each having a surface-symmetric shape whose single plane of symmetry is a y-z sectional plane (paper surface) of FIG. 4.

Reference characters X, Y and Z (unit: mm) denotes a position (x, y, z) of a surface apex of each optical surface in a coordinate system in which an origin (0, 0, 0) is set at the center of S1, the y- and z-axes orthogonal to each other are taken in the paper surface of FIG. 4 and the x-axis is taken so as to be orthogonal to the paper surface of FIG. 4. Reference character A (unit: °) denotes a rotational angle of each optical surface about the x-axis when a counterclockwise direction in FIG. 4 is defined as a positive direction. Reference character R denotes a curvature radius. A column of TYP shows surface shape types; SPH denotes a spherical surface, and FFS denotes a rotationally asymmetric surface expressed by following expression (7) where z represents a sag amount of the surface, c represents an apex curvature, k represents a conic constant (0 in this numerical example) and $r=\sqrt{(x^2+y^2)}$.

$$z = \frac{cr^2}{1+\sqrt{1-(1+k)c^2r^2}} + \sum_{j=2}^{66} C_j x^m y^n \quad (7)$$

The second term in the right side of expression (7) is expressed by following expression (8) where $C_j$ represents an aspheric coefficient.

$$\sum_{j=2}^{66} C_j x^m y^n = C_2 X + C_3 Y + C_4 X^2 + C_5 XY + C_6 Y^2 + C_7 X^3 + \\ C_8 X^2 Y + C_9 XY^2 + C_{10} Y^3 + C_{11} X^4 + C_{12} X^3 Y + C_{13} X^2 Y^2 + \\ C_{14} XY^3 + C_{15} Y^4 + C_{16} X^5 + C_{17} X^4 Y + C_{18} X^3 Y^2 + \\ C_{19} X^2 Y^3 + C_{20} XY^4 + C_{21} Y^5 + C_{22} X^6 + C_{23} X^5 Y + C_{24} X^4 Y^2 + \\ C_{25} X^3 Y^3 + C_{26} X^2 Y^4 + C_{27} XY^5 + C_{28} Y^6 + C_{29} X^7 + C_{30} X^6 Y + \\ C_{31} X^5 Y^2 + C_{32} X^4 Y^3 + C_{33} X^3 Y^4 + C_{34} X^2 Y^5 + C_{35} XY^6 + \\ C_{36} Y^7 + C_{37} X^8 + C_{38} X^7 Y + C_{39} X^6 Y^2 + C_{40} X^5 Y^3 + \\ C_{41} X^4 Y^4 + C_{42} X^3 Y^5 + C_{43} X^2 Y^6 + C_{44} XY^7 + C_{45} Y^8 + \dots \quad (8)$$

A numerical value added to FSS in the column of TYP shows that the surface shape corresponds to the aspheric coefficient $C_j$ listed in Table 1B. Non-listed aspheric coefficients $C_j$ are 0.

In Table 1A, Nd and vd respectively represent a refractive index and an abbe number of a medium after the optical surface for a d-line. When the medium is air, only its refractive index Nd, which is 1.000, is shown and its Abbe number is omitted. The optical surface S2 corresponds to the first surface (transmissive surface) 101, the optical surface S3 corresponds to the second surface (reflective surface) 102, the optical surface S4 corresponds to the first surface (reflective surface) 101, the optical surface S5 corresponds to the third surface (reflective surface) 103, the optical surface S6 corresponds to the fourth surface (internal total reflective surface) 104, and the optical surface S7 corresponds to the fifth surface (transmissive surface) 105.

TABLE 1A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | 2.231 | 33.565 | −3.270 | 1.53151 | 55.7 |
| 3 | FFS2 | ∞ | 0 | 4.759 | 48.479 | −19.928 | 1.53151 | 55.7 |
| 4 | FFS1 | ∞ | 0 | 2.231 | 33.565 | −3.270 | 1.53151 | 55.7 |
| 5 | FFS3 | ∞ | 0 | 92.469 | −27.324 | 81.407 | 1.53151 | 55.7 |
| 6 | FFS4 | ∞ | 0 | 28.976 | 30.249 | 11.397 | 1.53161 | 55.7 |
| 7 | FFS5 | ∞ | 0 | 31.244 | 62.217 | −45.987 | 1.00000 | |
| I | SPH | ∞ | 0 | 29.651 | 63.755 | −17.474 | | |

TABLE 1B

| Coefficient | FFS1 | FFS2 | FFS3 | FFS4 | FFS5 |
|---|---|---|---|---|---|
| C4 | −9.0936E−03 | −1.3105E−02 | −1.3713E−02 | 5.8141E−03 | −2.2773E−02 |
| C6 | −5.1745E−03 | −9.6901E−03 | 2.4693E−03 | 6.3888E−03 | −5.2465E−02 |
| C8 | −3.0703E−04 | −1.8810E−05 | −7.9663E−05 | 5.1313E−05 | −2.4952E−03 |
| C10 | −9.1877E−05 | 3.9002E−05 | 4.1887E−05 | 1.5174E−04 | −6.4656E−04 |
| C11 | −2.2738E−06 | −2.1152E−06 | −9.0780E−06 | 2.2403E−06 | 2.4717E−04 |
| C13 | −9.3240E−06 | −2.0863E−06 | 7.5845E−07 | −3.0725E−07 | −9.0284E−05 |
| C15 | 1.9002E−06 | 7.5704E−07 | −3.8378E−07 | −2.6912E−06 | −1.2941E−04 |
| C17 | 2.4301E−07 | 1.4354E−09 | −8.9511E−08 | −1.1484E−07 | 1.6225E−05 |
| C19 | −3.9825E−07 | 9.6476E−10 | 1.4203E−08 | −4.6483E−08 | −1.8856E−05 |
| C21 | 2.9997E−09 | 6.0571E−08 | −1.6390E−09 | −1.2207E−09 | −1.0965E−05 |

TABLE 1B-continued

| Coefficient | FFS1 | FFS2 | FFS3 | FFS4 | FFS5 |
|---|---|---|---|---|---|
| C22 | 1.6149E−08 | −7.4246E−11 | −5.1129E−09 | −7.5758E−09 | −2.3771E−06 |
| C24 | 7.4596E−09 | −8.3705E−10 | 4.8888E−10 | −1.8013E−09 | −1.5635E−06 |
| C26 | −8.4565E−09 | 1.0080E−09 | 3.0281E−12 | −3.5117E−10 | −9.0751E−07 |
| C28 | 2.1565E−10 | 1.9324E−09 | −1.0984E−13 | −1.5069E−11 | 4.6250E−07 |
| C30 | 6.0909E−11 | −2.4641E−12 | 1.5474E−11 | 5.3979E−10 | −3.5705E−08 |
| C32 | 1.1048E−09 | 3.7419E−11 | −2.8655E−12 | −1.9790E−11 | −1.4158E−07 |
| C34 | 8.3556E−10 | 6.2012E−11 | −7.4247E−18 | −2.3905E−11 | 2.8982E−08 |
| C36 | 4.7962E−12 | 2.7818E−11 | −5.1860E−15 | 9.0549E−14 | 7.9518E−09 |
| C37 | −1.1286E−11 | 7.1352E−13 | 3.4918E−12 | −1.2625E−12 | 7.7556E−09 |
| C39 | 1.1866E−12 | 8.4567E−13 | 7.4296E−13 | −9.4370E−12 | 1.4205E−08 |
| C41 | 7.0678E−11 | 2.5944E−13 | −8.6412E−14 | 1.6233E−12 | 1.9692E−09 |
| C43 | −7.8099E−12 | −5.3314E−13 | −2.4518E−16 | 4.6303E−13 | 4.2408E−09 |
| C45 | 1.3334E−13 | −2.3306E−13 | 7.6962E−17 | 5.5773E−15 | 7.8790E−10 |

NUMERICAL EXAMPLE 2

Figure 5:
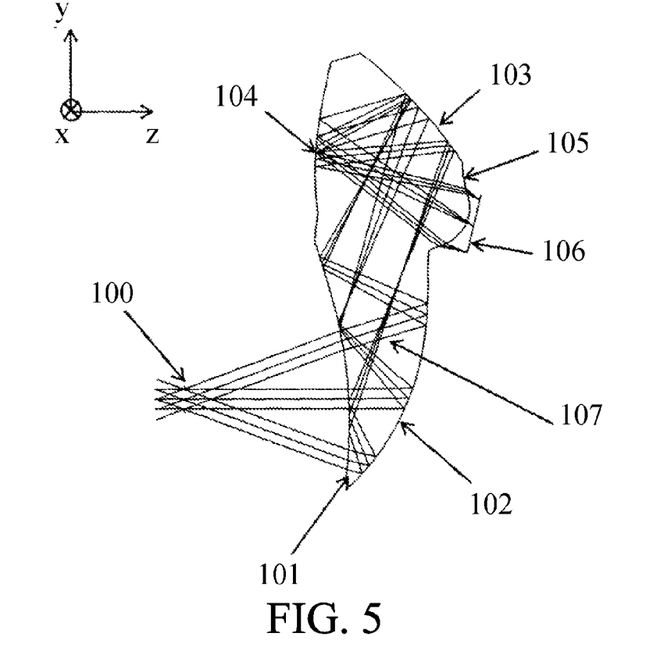
FIG. 5 illustrates an image display apparatus that is Numerical Example 2.

Table 2A shows optical data of Numerical Example 2, and FIG. 5 illustrates a sectional view of an optical path of this numerical example. In this numerical example, the image forming element 106 has a size of 18.4 mm×11.5 mm. The exit pupil 100 of the display optical system 107 has a horizontal diameter of about 4 mm and a vertical diameter of about 4 mm. The center of the exit pupil 100 is set at the rotational center position of the eyeball of the observer. The focal length of the display optical system 107 is about 16 mm. The display optical system 107 provides a horizontal angle of view of 60° and a vertical angle of view of 40° and displays an observation image at the infinite distance in the positive z-axis direction. Meanings of the optical data are identical to those of Numerical Example 1. Table 2B lists aspheric coefficients in this numerical example.

NUMERICAL EXAMPLE 3

Figure 6:
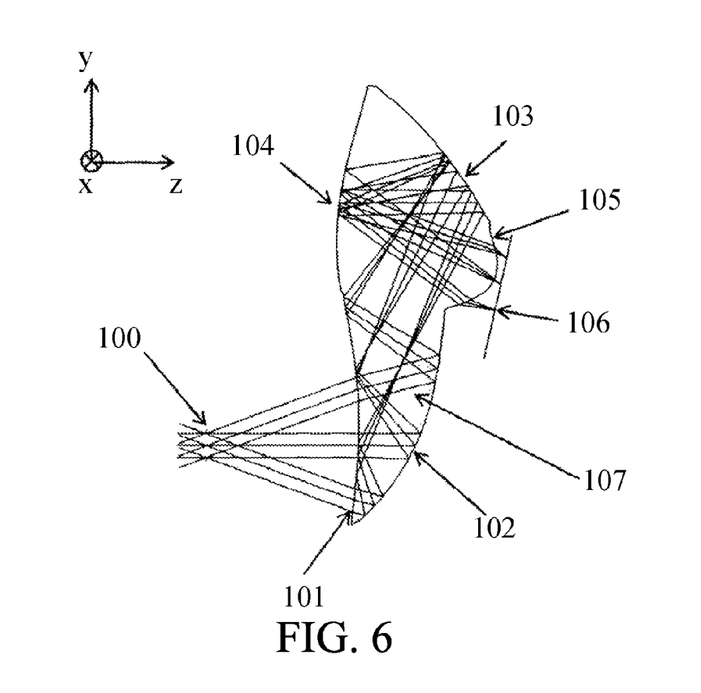
FIG. 6 illustrates an image display apparatus that is Numerical Example 3.

Table 3A shows optical data of Numerical Example 3, and FIG. 6 illustrates a sectional view of an optical path of this numerical example. In this numerical example, the image forming element 106 has a size of 18.4 mm×11.5 mm. The exit pupil 100 of the display optical system 107 has a horizontal diameter of about 5.6 mm and a vertical diameter of about 5.6 mm. The center of the exit pupil 100 is set at the rotational center position of the eyeball of the observer. The focal length of the display optical system 107 is about 16 mm. The display optical system 107 provides a horizontal angle of view of 60° and a vertical angle of view of 40° and displays an observation image at the infinite distance in the positive z-axis direction. Meanings of the optical data are identical to those of Numerical Example 1. Table 3B lists aspheric coefficients in this numerical example.

TABLE 2A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −12.278 | 35.882 | −3.193 | 1.53151 | 55.7 |
| 3 | FFS2 | ∞ | 0 | −0.030 | 49.159 | −22.452 | 1.53151 | 55.7 |
| 4 | FFS1 | ∞ | 0 | −12.278 | 35.882 | −3.193 | 1.53151 | 55.7 |
| 5 | FFS3 | ∞ | 0 | 93.640 | −29.420 | 83.311 | 1.53151 | 55.7 |
| 6 | FFS4 | ∞ | 0 | 27.887 | 32.729 | 20.750 | 1.53151 | 55.7 |
| 7 | FFS5 | ∞ | 0 | 35.730 | 60.771 | −39.254 | 1.00000 | |
| I | SPH | ∞ | 0 | 37.280 | 63.648 | −14.804 | | |

TABLE 3A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −3.582 | 33.665 | −4.006 | 1.53151 | 55.7 |
| 3 | FFS2 | ∞ | 0 | −1.271 | 45.680 | −27.065 | 1.53151 | 55.7 |
| 4 | FFS1 | ∞ | 0 | −3.582 | 33.665 | −4.006 | 1.53151 | 55.7 |
| 5 | FFS3 | ∞ | 0 | 96.589 | −29.229 | 82.112 | 1.53151 | 55.7 |
| 6 | FFS4 | ∞ | 0 | 28.728 | 31.024 | 14.197 | 1.53151 | 55.7 |
| 7 | FFS5 | ∞ | 0 | 32.805 | 61.050 | −54.707 | 1.00000 | |
| I | SPH | ∞ | 0 | 32.321 | 64.719 | −13.391 | | |

TABLE 2B

| Coefficient | FFS1 | FFS2 | FFS3 | FFS4 | FFS5 |
|---|---|---|---|---|---|
| C4 | −6.0417E−03 | −1.2442E−02 | −1.2469E−02 | 6.2694E−03 | −1.0625E−02 |
| C6 | −2.6769E−03 | −9.6225E−03 | 6.2434E−04 | 6.7272E−03 | −5.4407E−02 |
| C8 | −2.1642E−04 | −6.4340E−06 | −5.3341E−05 | 2.0638E−05 | −1.3937E−03 |
| C10 | −7.4249E−05 | 1.1091E−05 | 2.9740E−05 | 1.6565E−04 | 3.7869E−04 |
| C11 | 5.9312E−07 | −1.5315E−06 | −5.6115E−06 | 1.3434E−06 | 1.0329E−04 |
| C13 | −2.4024E−06 | −1.4846E−06 | 5.7491E−07 | 1.0251E−06 | 8.8126E−06 |
| C15 | 2.0855E−08 | −4.9632E−08 | −2.6303E−07 | −2.7188E−06 | −3.0334E−04 |
| C17 | 9.2887E−08 | 4.3452E−09 | −6.5057E−08 | −5.4826E−08 | 7.1020E−08 |
| C19 | 7.2848E−08 | 8.9423E−09 | 1.0400E−08 | −8.2773E−08 | −1.6512E−05 |
| C21 | 1.6046E−08 | 2.9871E−08 | −1.1040E−09 | 1.9920E−09 | −3.9064E−05 |
| C22 | −4.4539E−10 | −2.4109E−10 | −4.7618E−10 | 6.5063E−10 | −4.9496E−07 |
| C24 | 9.6340E−10 | −8.4195E−10 | 8.8123E−12 | −1.5715E−09 | −1.2306E−06 |
| C26 | −2.0102E−09 | −7.5973E−10 | 1.4353E−12 | −1.0135E−10 | 1.9111E−06 |
| C28 | −3.0086E−11 | 1.1116E−10 | 4.6469E−13 | 2.2286E−11 | 1.4615E−06 |

TABLE 3B

| Coefficient | FFS1 | FFS2 | FFS3 | FFS4 | FFS5 |
|---|---|---|---|---|---|
| C4  | −1.0187E−02 | −1.3291E−02 | −1.0403E−02 | 6.1508E−03 | −1.8379E−02 |
| C6  | −3.4197E−03 | −9.7005E−03 | 1.0965E−03 | 5.8720E−03 | −4.5737E−02 |
| C8  | −1.8947E−04 | −3.0804E−06 | −3.9526E−05 | 9.0294E−05 | −1.7396E−03 |
| C10 | −8.3002E−05 | 1.1332E−05 | 2.9574E−05 | 1.6241E−04 | −1.9243E−03 |
| C11 | 2.8158E−06 | −1.8251E−06 | −8.7532E−06 | 1.7595E−07 | 1.1335E−04 |
| C13 | −5.7816E−06 | −1.6667E−06 | 3.9075E−07 | −2.9951E−06 | −8.6981E−05 |
| C15 | 9.9144E−07 | 2.0657E−07 | −2.7673E−07 | −2.5019E−06 | −1.7115E−04 |
| C17 | 2.6047E−08 | 8.9490E−09 | −1.0259E−07 | −7.1156E−08 | 1.9174E−05 |
| C19 | −1.1731E−07 | 2.6523E−08 | 7.8831E−09 | −1.3947E−08 | −8.1353E−06 |
| C21 | 1.6846E−08 | 3.9174E−08 | −7.3000E−10 | −1.9598E−09 | −3.3100E−05 |
| C22 | −1.0578E−09 | −6.5069E−10 | 9.0733E−10 | 4.0796E−09 | −1.6309E−07 |
| C24 | 3.5119E−09 | −1.1893E−09 | −8.1073E−11 | −8.4333E−10 | 1.1436E−06 |
| C26 | 2.9691E−09 | −1.5799E−09 | −1.0057E−11 | −9.5676E−11 | −1.1842E−06 |
| C28 | −2.4327E−11 | 2.2092E−10 | 1.0059E−12 | −4.9928E−12 | −7.3602E−07 |
| C30 | −2.8973E−11 | 3.2758E−12 | −9.6683E−13 | −3.2831E−11 | −1.3962E−08 |
| C32 | 1.9428E−10 | 6.1132E−11 | 4.8615E−13 | 1.2634E−11 | −7.3124E−08 |
| C34 | 2.7238E−11 | 9.2837E−11 | 1.0814E−14 | 3.0879E−12 | 1.2332E−07 |
| C36 | 1.8004E−13 | −4.8682E−12 | −2.8688E−16 | 2.2522E−13 | −2.4479E−08 |

NUMERICAL EXAMPLE 4

Figure 7:
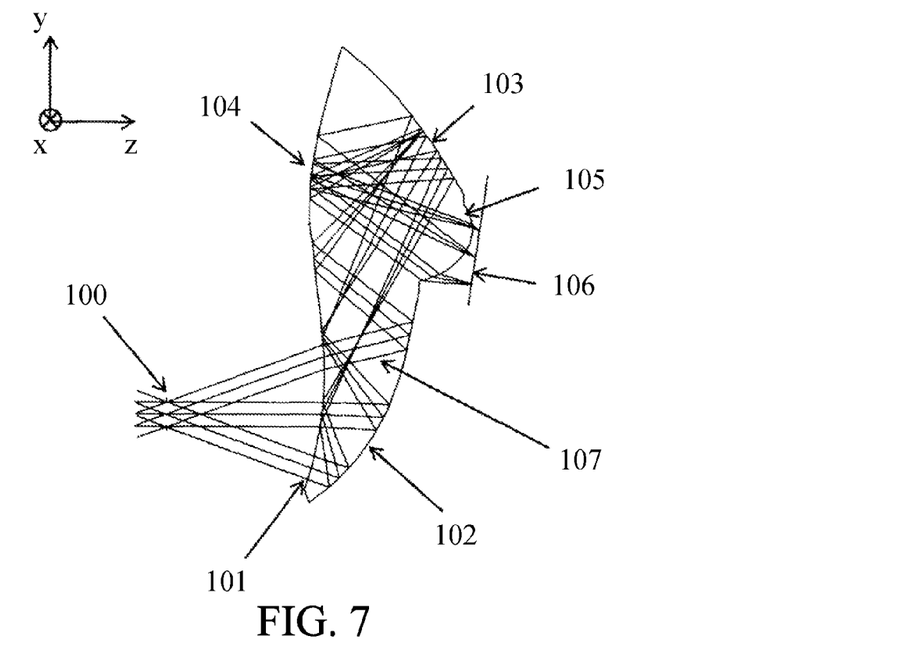
FIG. 7 illustrates an image display apparatus that is Numerical Example 4.

Table 4A shows optical data of Numerical Example 4, and FIG. 7 illustrates a sectional view of an optical path of this numerical example. In this numerical example, the image forming element 106 has a size of 18.4 mm×11.5 mm. The exit pupil 100 of the display optical system 107 has a horizontal diameter of about 4 mm and a vertical diameter of about 4 mm. The center of the exit pupil 100 is set at the rotational center position of the eyeball of the observer. The focal length of the display optical system 107 is about 16 mm. The display optical system 107 provides a horizontal angle of view of 60° and a vertical angle of view of 40° and displays an observation image at the infinite distance in the positive z-axis direction. Meanings of the optical data are identical to those of Numerical Example 1. Table 4B lists aspheric coefficients in this numerical example.

NUMERICAL EXAMPLE 5

Figure 8:
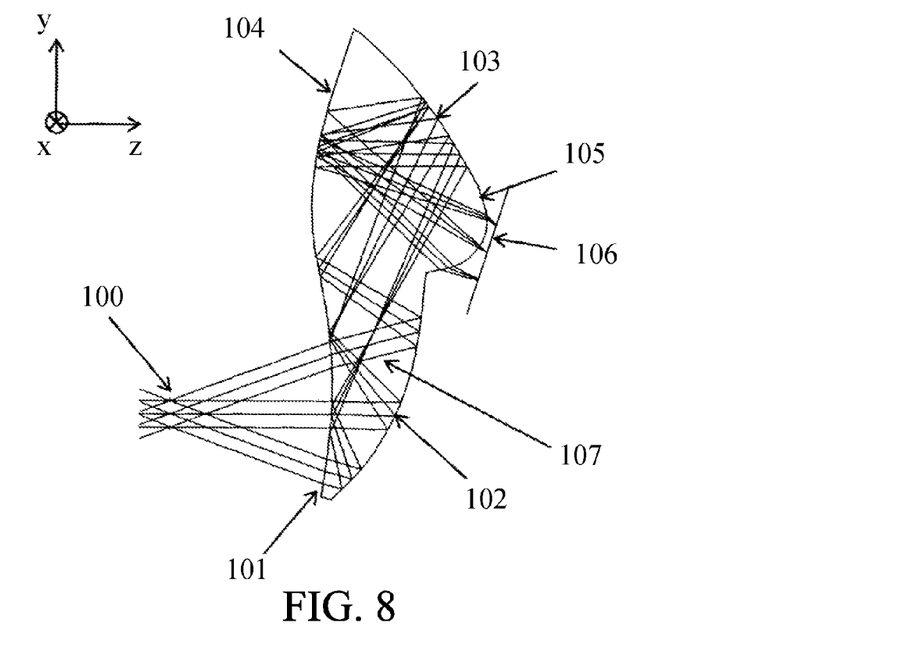
FIG. 8 illustrates an image display apparatus that is Numerical Example 5.

Table 5A shows optical data of Numerical Example 5, and FIG. 8 illustrates a sectional view of an optical path of this numerical example. In this numerical example, the image forming element 106 has a size of 18.4 mm×11.5 mm. The exit pupil 100 of the display optical system 107 has a horizontal diameter of about 4 mm and a vertical diameter of about 4 mm. The center of the exit pupil 100 is set at the rotational center position of the eyeball of the observer. The focal length of the display optical system 107 is about 16 mm. The display optical system 107 provides a horizontal angle of view of 60° and a vertical angle of view of 40° and displays an observation image at the infinite distance in the positive z-axis direction. Meanings of the optical data are identical to those of Numerical Example 1. Table 5B lists aspheric coefficients in this numerical example.

TABLE 4A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | 0.086 | 33.312 | −6.629 | 1.53151 | 55.7 |
| 3 | FFS2 | ∞ | 0 | 11.470 | 51.175 | −14.880 | 1.53151 | 55.7 |
| 4 | FFS1 | ∞ | 0 | 0.086 | 33.312 | −6.629 | 1.53151 | 55.7 |
| 5 | FFS3 | ∞ | 0 | 97.774 | −28.978 | 79.560 | 1.53151 | 55.7 |
| 6 | FFS4 | ∞ | 0 | 26.123 | 33.120 | 15.755 | 1.53151 | 55.7 |
| 7 | FFS5 | ∞ | 0 | 34.784 | 64.689 | −30.913 | 1.00000 | |
| I | SPH | ∞ | 0 | 36.722 | 67.380 | −9.204 | | |

TABLE 5A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −1.239 | 33.100 | −4.390 | 1.53151 | 55.7 |
| 3 | FFS2 | ∞ | 0 | 5.788 | 48.619 | −18.385 | 1.53151 | 55.7 |
| 4 | FFS1 | ∞ | 0 | −1.239 | 33.100 | −4.390 | 1.53151 | 55.7 |
| 5 | FFS3 | ∞ | 0 | 98.674 | −27.956 | 78.453 | 1.53151 | 55.7 |
| 6 | FFS4 | ∞ | 0 | 29.759 | 30.240 | 11.213 | 1.53151 | 55.7 |
| 7 | FFS5 | ∞ | 0 | 32.235 | 62.163 | −46.291 | 1.00000 | |
| I | SPH | ∞ | 0 | 33.132 | 65.435 | −18.821 | | |

TABLE 4B

| Coefficient | FFS1 | FFS2 | FFS3 | FFS4 | FFS5 |
|---|---|---|---|---|---|
| C4  | −7.6456E−03 | −1.2391E−02 | −9.6769E−03 | 6.7858E−03 | −3.1709E−02 |
| C6  | −7.1808E−03 | −6.2091E−03 | 1.3269E−03 | 5.9237E−03 | −3.7753E−02 |
| C8  | −4.0557E−04 | 2.1170E−05 | −5.7815E−05 | 3.2258E−05 | −1.5837E−03 |
| C10 | 2.9972E−06 | 1.7231E−04 | 2.9740E−05 | 1.4620E−04 | −6.1969E−04 |
| C11 | 1.2782E−07 | −1.2755E−06 | −7.3557E−06 | −2.5943E−06 | 8.2958E−05 |
| C13 | −5.5274E−06 | 1.7833E−06 | 4.4169E−07 | 7.6226E−08 | −3.0554E−04 |
| C15 | 1.7993E−06 | 3.5239E−06 | −2.7171E−07 | −2.1342E−06 | −4.3137E−04 |
| C17 | 2.6695E−07 | 4.4675E−08 | −5.8300E−08 | −9.6771E−08 | 1.0598E−05 |
| C19 | −1.0317E−07 | 1.2235E−07 | 1.0003E−08 | −7.0434E−08 | −1.7335E−05 |
| C21 | 4.2485E−09 | 4.3239E−08 | −1.0409E−09 | 1.6271E−09 | −3.7924E−05 |
| C22 | 4.8626E−09 | −1.8808E−12 | −1.7700E−09 | 5.1734E−09 | 1.2082E−07 |
| C24 | 9.0178E−09 | 1.3585E−09 | 1.9712E−10 | 4.0724E−09 | 5.5056E−07 |
| C26 | 9.2475E−09 | 1.9311E−09 | −1.2159E−11 | 6.7045E−10 | 9.8293E−08 |
| C28 | −1.1559E−10 | −5.3963E−10 | 5.8750E−13 | −4.9226E−11 | −7.8414E−07 |

TABLE 5B

| Coefficient | FFS1 | FFS2 | FFS3 | FFS4 | FFS5 |
| --- | --- | --- | --- | --- | --- |
| C4  | −8.8581E−03 | −1.3019E−02 | −1.3196E−02 |  6.1442E−03 | −2.0004E−02 |
| C6  | −4.9447E−03 | −9.2142E−03 |  1.7710E−03 |  6.8545E−03 | −4.8087E−02 |
| C8  | −2.7411E−04 | −1.0236E−05 | −7.4322E−05 |  3.8856E−05 | −1.8914E−03 |
| C10 | −8.0573E−05 |  5.9859E−05 |  3.4947E−05 |  1.2747E−04 | −6.6285E−05 |
| C11 |  1.9948E−06 | −1.6068E−06 | −1.8910E−06 |  3.2358E−07 |  7.2786E−05 |
| C13 | −5.4915E−06 | −1.5014E−06 |  7.2677E−07 | −7.7019E−08 | −4.1210E−05 |
| C15 |  2.1807E−06 |  1.2498E−06 | −3.1149E−07 | −2.1087E−06 | −1.8930E−04 |
| C17 |  1.4674E−07 |  3.7751E−09 | −6.3439E−08 | −7.3920E−08 |  1.7761E−05 |
| C19 | −1.9632E−07 |  9.0667E−09 |  1.2414E−08 | −5.9216E−08 | −2.1882E−05 |
| C21 | −5.4734E−09 |  4.3139E−08 | −1.4705E−09 | −3.3149E−09 | −2.2000E−05 |
| C22 | −8.7928E−11 | −2.6176E−10 | −2.6385E−09 |  3.8376E−09 | −1.2172E−07 |
| C24 |  6.1782E−09 | −1.9493E−10 | −4.0491E−10 |  1.8150E−10 | −8.0981E−07 |
| C26 |  2.2838E−10 | −1.6722E−10 | −4.0849E−13 |  3.9805E−11 | −8.6720E−07 |
| C28 |  6.6823E−11 |  1.6735E−10 |  5.8092E−14 | −1.4899E−11 |  7.0654E−08 |
| C30 | −6.6909E−11 |  1.0331E−11 | −3.1323E−11 | −3.9882E−11 | −4.5140E−08 |
| C32 |  7.2893E−10 |  1.2603E−11 |  1.6695E−12 | −1.3109E−12 | −1.3880E−07 |
| C34 |  1.2571E−10 |  2.1805E−12 | −3.4671E−15 | −2.4816E−12 |  6.9728E−08 |
| C36 |  4.6843E−13 |  1.4603E−12 | −8.5458E−16 |  7.7061E−14 | −1.5266E−08 |

NUMERICAL EXAMPLE 6

Figure 9:
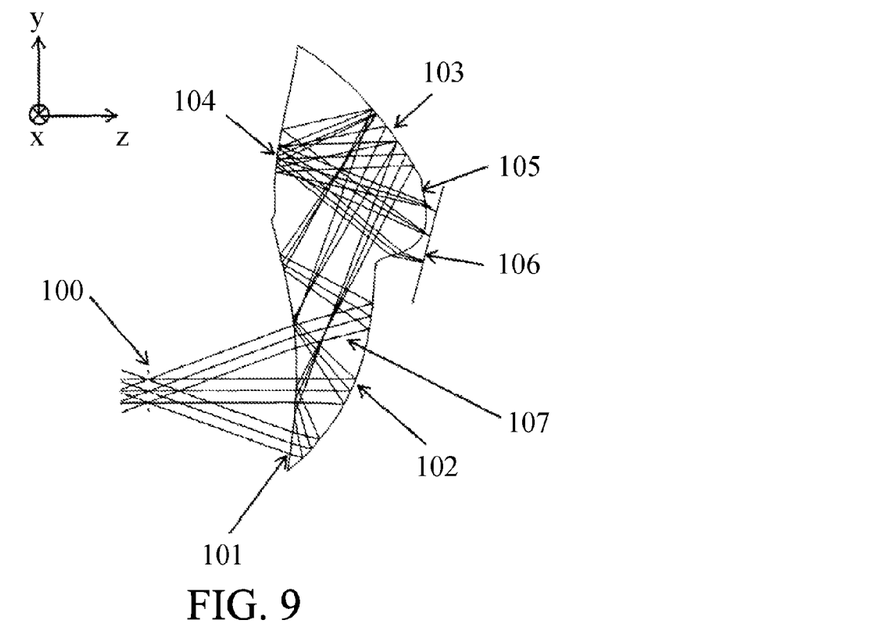
FIG. 9 illustrates an image display apparatus that is Numerical Example 6.

Table 6A shows optical data of Numerical Example 6, and FIG. 9 illustrates a sectional view of an optical path of this numerical example. In this numerical example, the image forming element 106 has a size of 18.4 mm×11.5 mm. The exit pupil 100 of the display optical system 107 has a horizontal diameter of about 4 mm and a vertical diameter of about 4 mm. The center of the exit pupil 100 is set at the rotational center position of the eyeball of the observer. The focal length of the display optical system 107 is about 16 mm. The display optical system 107 provides a horizontal angle of view of 60° and a vertical angle of view of 40° and displays an observation image at the infinite distance in the positive z-axis direction. Meanings of the optical data are identical to those of Numerical Example 1. Table 6B lists aspheric coefficients in this numerical example.

TABLE 6A

| S | TYP | R | X | Y | Z | A | Nd | vd |
| --- | --- | --- | --- | --- | --- | --- | --- | --- |
| 1 | SPH | ∞ | 0 | 0 | 0 | 0 | 1.00000 | |
| 2 | FFS1 | ∞ | 0 | −16.667 | 32.149 | −7.533 | 1.53151 | 55.7 |
| 3 | FFS2 | ∞ | 0 | 2.233 | 47.377 | −22.566 | 1.53151 | 55.7 |
| 4 | FFS1 | ∞ | 0 | −16.667 | 32.149 | −7.533 | 1.53151 | 55.7 |
| 5 | FFS3 | ∞ | 0 | 87.181 | −29.434 | 85.367 | 1.53151 | 55.7 |
| 6 | FFS4 | ∞ | 0 | 30.972 | 30.711 | 11.863 | 1.53151 | 55.7 |
| 7 | FFS5 | ∞ | 0 | 32.464 | 61.093 | −52.481 | 1.00000 | |
| I | SPH | ∞ | 0 | 32.689 | 64.483 | −15.877 | | |

TABLE 6B

| Coefficient | FFS1 | FFS2 | FFS3 | FFS4 | FFS5 |
| --- | --- | --- | --- | --- | --- |
| C4  | −7.0577E−03 | −1.3521E−02 | −1.3953E−02 |  5.8988E−03 | −1.0818E−02 |
| C6  |  1.9333E−04 | −9.9277E−03 |  3.0288E−03 |  6.6012E−03 | −5.2242E−02 |
| C8  | −1.5464E−04 | −9.4553E−06 | −8.5105E−05 |  6.1218E−05 | −3.1803E−03 |
| C10 | −1.0028E−04 |  2.7527E−05 |  4.3029E−05 |  1.4495E−04 | −1.9736E−03 |
| C11 |  2.6408E−06 | −1.6942E−06 | −8.1031E−06 |  5.5119E−07 |  6.6650E−05 |
| C13 | −2.8142E−06 | −1.9651E−06 |  8.2694E−07 | −1.8093E−06 | −1.1601E−04 |
| C15 | −4.2285E−07 |  5.0691E−07 | −3.9418E−07 | −2.7898E−06 | −2.8071E−04 |
| C17 |  5.5367E−08 |  6.9271E−09 | −7.8157E−08 | −7.2023E−08 |  2.7125E−05 |
| C19 | −3.6415E−08 | −9.8889E−09 |  1.6304E−08 | −5.5616E−08 |  4.8820E−06 |
| C21 |  1.7815E−08 |  3.6251E−08 | −1.2216E−09 | −9.8901E−09 | −2.7535E−05 |
| C22 | −1.5842E−09 | −3.0901E−10 |  2.4761E−10 |  2.3530E−09 | −5.5858E−07 |
| C24 |  5.0875E−09 | −1.1702E−09 |  4.5073E−12 | −1.6381E−09 |  6.7859E−07 |
| C26 | −9.2068E−10 | −4.2610E−10 | −2.4866E−12 | −2.2828E−10 |  2.1113E−08 |
| C28 | −8.8127E−13 | −1.2718E−10 |  5.7716E−13 |  5.1572E−11 |  2.1794E−06 |
| C30 | −1.3560E−10 | −1.0455E−11 | −2.5638E−11 |  4.4528E−12 | −1.2339E−07 |
| C32 |  4.4025E−11 |  4.0344E−11 | −3.6801E−13 |  1.1068E−12 | −2.9898E−08 |
| C34 |  7.9033E−12 |  5.8489E−11 | −9.3796E−16 | −1.0279E−13 | −1.3149E−07 |
| C36 |  1.3803E−14 |  5.9012E−12 |  7.5129E−17 | −3.0712E−14 |  5.2391E−08 |

NUMERICAL EXAMPLE 7

Figure 10:
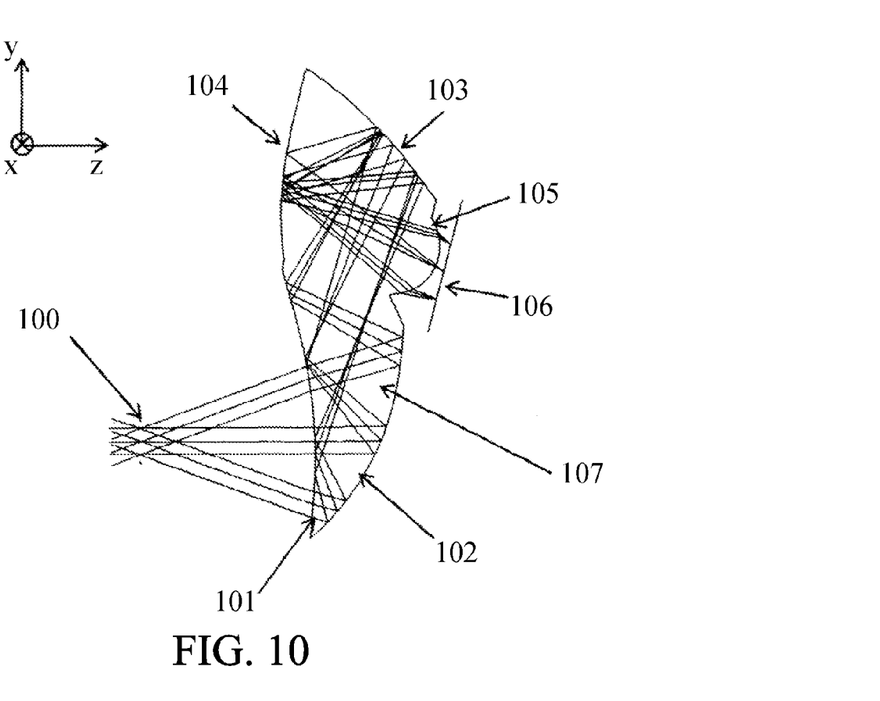
FIG. 10 illustrates an image display apparatus that is Numerical Example 7.

Table 7A shows optical data of Numerical Example 7, and FIG. 10 illustrates a sectional view of an optical path of this numerical example. In this numerical example, the image forming element 106 has a size of 18.4 mm×11.5 mm. The exit pupil 100 of the display optical system 107 has a horizontal diameter of about 4.6 mm and a vertical diameter of about 4.3 mm. The center of the exit pupil 100 is set at the rotational center position of the eyeball of the observer. The focal length of the display optical system 107 is about 16 mm. The display optical system 107 provides a horizontal angle of view of 60° and a vertical angle of view of 40° and displays an observation image at the infinite distance in the positive z-axis direction. Meanings of the optical data are identical to those of Numerical Example 1. Table 7B lists aspheric coefficients in this numerical example.

NUMERICAL EXAMPLE 8

Figure 11:
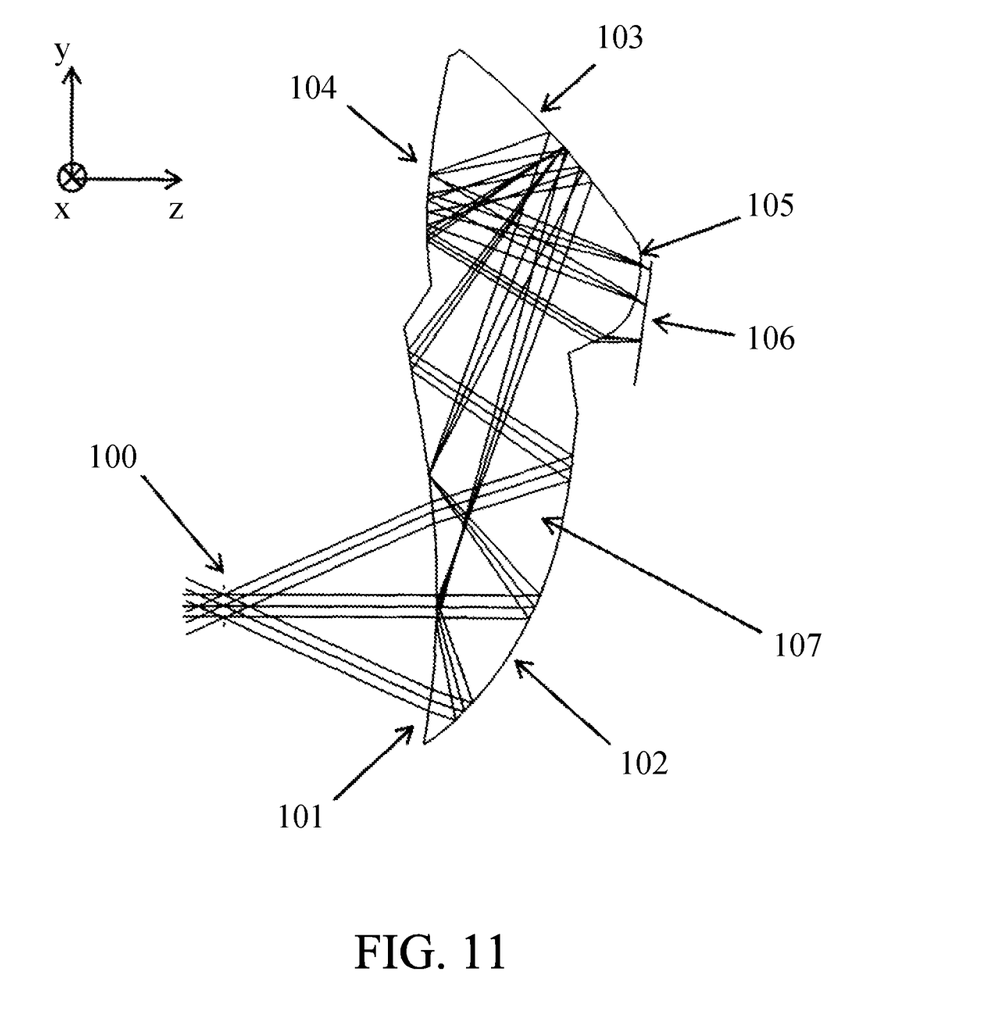
FIG. 11 illustrates an image display apparatus that is Numerical Example 8.

Table 8A shows optical data of Numerical Example 8, and FIG. 11 illustrates a sectional view of an optical path of this numerical example. In this numerical example, the image forming element 106 has a size of 18.4 mm×11.5 mm. The exit pupil 100 of the display optical system 107 has a horizontal diameter of about 5.4 mm and a vertical diameter of about 3.7 mm. The center of the exit pupil 100 is set at the rotational center position of the eyeball of the observer. The focal length of the display optical system 107 is about 13 mm. The display optical system 107 provides a horizontal angle of view of 70° and a vertical angle of view of 47° and displays an observation image at the infinite distance in the positive z-axis direction. Meanings of the optical data are identical to those of Numerical Example 1. Table 8B lists aspheric coefficients in this numerical example.

TABLE 7A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −7.056 | 35.838 | −2.028 | 1.53151 | 55.7 |
| 3 | FFS2 | ∞ | 0 | −2.389 | 48.210 | −25.749 | 1.53151 | 55.7 |
| 4 | FFS1 | ∞ | 0 | −7.056 | 35.838 | −2.028 | 1.53151 | 55.7 |
| 5 | FFS3 | ∞ | 0 | 92.922 | −31.003 | 82.072 | 1.53151 | 55.7 |
| 6 | FFS4 | ∞ | 0 | 26.325 | 32.432 | 20.538 | 1.53151 | 55.7 |
| 7 | FFS5 | ∞ | 0 | 33.370 | 59.803 | −34.348 | 1.00000 | |
| I | SPH | ∞ | 0 | 35.147 | 62.629 | −14.833 | | |

TABLE 8A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −20.741 | 33.112 | −9.649 | 1.53151 | 55.7 |
| 3 | FFS2 | ∞ | 0 | −9.323 | 46.071 | −35.803 | 1.53151 | 55.7 |
| 4 | FFS1 | ∞ | 0 | −20.741 | 33.112 | −9.649 | 1.53151 | 55.7 |
| 5 | FFS3 | ∞ | 0 | 112.506 | −31.436 | 81.024 | 1.53151 | 55.7 |
| 6 | FFS4 | ∞ | 0 | 36.198 | 38.454 | 22.172 | 1.53151 | 55.7 |
| 7 | FFS5 | ∞ | 0 | 41.891 | 59.957 | −66.718 | 1.00000 | |
| I | SPH | ∞ | 0 | 30.599 | 67.180 | −8.399 | | |

TABLE 7B

| Coefficient | FFS1 | FFS2 | FFS3 | FFS4 | FFS5 |
|---|---|---|---|---|---|
| C4 | −6.8451E−03 | −1.2356E−02 | −9.4712E−03 | 6.0193E−03 | −2.3544E−02 |
| C6 | −4.0294E−03 | −9.6787E−03 | 4.6624E−04 | 7.4419E−03 | −5.0623E−02 |
| C8 | −1.5921E−04 | −9.2675E−06 | −1.1840E−05 | 1.0618E−04 | 2.0467E−04 |
| C10 | −5.1724E−05 | 7.4669E−06 | 2.4067E−05 | 1.6358E−04 | 2.2357E−03 |
| C11 | −5.7359E−07 | −1.7164E−06 | −1.0949E−05 | 9.4530E−07 | 2.3249E−04 |
| C13 | −2.1108E−06 | −1.6309E−06 | 1.9452E−07 | −3.2163E−06 | 1.7606E−04 |
| C15 | 3.4726E−07 | −3.5587E−07 | −2.2225E−07 | −2.7931E−06 | −3.1708E−04 |
| C17 | −4.9518E−08 | 6.4858E−09 | −1.1479E−07 | −7.6155E−08 | 6.0359E−06 |
| C19 | −1.0727E−07 | 4.4520E−09 | 3.6990E−09 | −2.6755E−08 | −2.5646E−05 |
| C21 | 1.8424E−08 | 3.1596E−08 | −6.2258E−10 | 1.5210E−10 | −3.3272E−05 |
| C22 | −2.3160E−09 | −6.6793E−10 | −2.0244E−09 | 2.6843E−09 | −1.1259E−06 |
| C24 | −8.9880E−11 | −1.5009E−09 | 1.3689E−10 | −1.0052E−09 | −2.7990E−06 |
| C26 | −6.3442E−09 | −9.7100E−10 | −1.5934E−11 | −6.1837E−11 | −4.2181E−07 |
| C28 | −1.3951E−10 | 7.9695E−11 | 9.0132E−14 | 3.2019E−11 | 1.8541E−06 |
| C30 | −3.1019E−11 | 1.6869E−11 | 5.7185E−12 | −3.5404E−11 | 7.5580E−09 |
| C32 | 2.7669E−10 | 6.4758E−11 | 3.7458E−13 | 8.4752E−12 | −1.5692E−07 |
| C34 | −6.7295E−12 | 5.0292E−11 | −1.2735E−14 | 1.2266E−12 | 8.2962E−08 |
| C36 | 1.3918E−13 | −8.6286E−12 | −1.9605E−15 | 2.1375E−13 | 3.4569E−08 |
| C37 | 3.7983E−12 | −2.1219E−13 | 9.5414E−13 | −2.3637E−12 | 5.1296E−09 |
| C39 | −4.1545E−12 | 3.4353E−13 | 3.7668E−13 | −3.9777E−12 | −3.9827E−09 |
| C41 | 1.6648E−11 | −1.4694E−12 | −9.8650E−15 | 6.7951E−14 | 3.5384E−08 |
| C43 | 3.7216E−12 | −1.7234E−13 | 4.4395E−17 | 7.3488E−15 | −4.8737E−09 |
| C45 | −7.0994E−16 | 7.3533E−13 | 3.0533E−17 | 1.3887E−15 | −6.9394E−09 |

TABLE 8B

| Coefficient | FFS1 | FFS2 | FFS3 | FFS4 | FFS5 |
|---|---|---|---|---|---|
| C4 | −6.7645E−03 | −1.1720E−02 | −1.0383E−02 | 5.2598E−03 | −5.9234E−03 |
| C6 | −2.9748E−03 | −8.6794E−03 | −3.7987E−04 | 5.6805E−03 | 7.1259E−03 |
| C8 | −1.6780E−04 | 5.6510E−07 | −2.5958E−05 | 7.9397E−05 | −3.6276E−03 |
| C10 | −2.2562E−05 | 8.4617E−06 | 1.9042E−05 | 1.4523E−04 | −1.2279E−03 |
| C11 | 3.5292E−06 | −8.2249E−07 | −3.0234E−06 | −3.7614E−07 | 2.6478E−05 |
| C13 | 6.1945E−06 | −1.6333E−06 | −3.0387E−06 | −3.4019E−06 | −2.4306E−05 |
| C15 | −1.1178E−07 | −1.8190E−06 | −1.4282E−07 | −2.6383E−06 | −5.3137E−04 |
| C17 | −9.8369E−08 | −2.6627E−09 | −2.3139E−08 | −2.5585E−08 | 2.3421E−05 |
| C19 | −2.0918E−07 | 3.6157E−08 | 4.2398E−09 | 9.7571E−09 | 2.4262E−05 |
| C21 | 5.4070E−09 | 4.6281E−08 | −5.6364E−10 | 1.2606E−08 | 3.2047E−05 |
| C22 | −4.4957E−10 | −4.8906E−10 | 1.6069E−10 | 3.3085E−10 | −1.9043E−07 |
| C24 | 2.6898E−09 | −5.3081E−10 | 7.3716E−11 | −2.2723E−10 | −9.7584E−07 |
| C26 | 1.0683E−09 | −4.2148E−10 | 1.0535E−12 | −6.7541E−11 | −1.1353E−06 |
| C28 | −2.6910E−12 | −5.1552E−11 | 2.9939E−13 | −1.0143E−11 | −5.9893E−07 |

Table 9 collectively lists values of L12/f, L45/L12 and L45/L13 in Numerical Examples 1 to 8. All the values satisfy the corresponding conditions, which results in compact image display apparatuses each providing a wide angle of view.

TABLE 9

|  | L12/f | L45/L13 | L45/L12 |
|---|---|---|---|
| Example 1 | 0.808 | 0.827 | 3.070 |
| Example 2 | 0.828 | 0.746 | 2.820 |
| Example 3 | 0.774 | 0.787 | 3.143 |
| Example 4 | 0.836 | 0.796 | 2.853 |
| Example 5 | 0.813 | 0.806 | 3.044 |
| Example 6 | 0.774 | 0.779 | 3.088 |
| Example 7 | 0.844 | 0.765 | 2.679 |
| Example 8 | 1.244 | 0.667 | 2.303 |

[Embodiment 2]

An optical system having the same configuration as that of Embodiment 1 (Numerical Examples 1 to 8) can be used as an image capturing optical system of an image capturing apparatus such as a video camera and a digital still camera.

In the image capturing apparatus, a light flux coming from an object and transmitted through the first surface (S2) 101 enters the image capturing optical system. The image capturing optical system causes the light flux to reflect at the second surface (S3) 102, the first surface (S4) 101 and the third surface (S5) 103 in this order. The reflection at the first surface 101 is internal total reflection. Thereafter, the image capturing optical system causes the light flux to reflect at the fourth surface (S6) 104 and then causes the light flux to be transmitted through the fifth surface (S7) 105 to introduce the light flux to an image sensor provided instead of the image forming element 106 in Embodiment 1. The light flux thus introduced to the image sensor images thereon to form an optical image of the object (object image).

The image sensor is constituted by a CCD sensor, a CMOS sensor or the like and photoelectrically converts (that is, captures) the object image formed on its image capturing surface. The image capturing optical system causes the light flux from the object to form an intermediate image in the image capturing optical system. Moreover, the image capturing optical system in this embodiment causes at least part of an optical path of the light flux proceeding from the first surface 101 to the third surface 103 to intersect with at least part of an optical path of the light flux proceeding from the fourth surface 104 to the fifth surface 105.

In this embodiment, a ray passing through a center of an entrance pupil (stop) S1 of the image capturing optical system and reaching a center of the image capturing surface (image capturing area) of the image sensor is referred to as "a central-view-angle principal ray". A distance between hit points of the central-view-angle principal ray on two surfaces of the optical surfaces (first to fifth surfaces 101 to 105) is referred to as "a hit point distance" between the two surfaces.

When the hit point distance between the fourth and fifth surfaces 104 and 105 is referred to as "a hit point distance L45", the hit point distance between the first and second surfaces 101 and 102 is referred to as "a hit point distance L12", the hit point distance between the first and third surfaces 101 and 103 is referred to as "a hit point distance L13" and f represents a focal length of the image capturing optical system, the image capturing optical system satisfies the conditions of expressions (1) (or (3), (2) (or (4)) and (5) (or (6)).

The image capturing optical system satisfying the above conditions enables realizing a compact image capturing optical system having a wider angle of view than those of conventional ones and capable of acquiring a high quality captured image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145890, filed on Jul. 23, 2015, which is hereby incorporated by reference herein in its entirety.

What is claimed is:

1. An image display apparatus comprising:
an image forming element configured to form an original image; and
a display optical system formed by an optical element whose inside surrounded by optical surfaces including a first surface, a second surface, a third surface, a fourth surface and a fifth surface is filled with an optical medium and configured to introduce a light flux from the original image to an exit pupil,
wherein the display optical system is configured to:
cause the light flux exiting from the original image to be refracted on the fifth surface, reflected on the fourth surface, reflected on the third surface, reflected on the first surface and reflected on the second surface in this order and then cause the light flux to be refracted on the first surface and exit toward the exit pupil;
cause the light flux to form an intermediate image inside the display optical system; and cause at least part of an optical path of the light flux proceeding from the fifth surface to the fourth surface to intersect with at least part of an optical path of the light flux proceeding from the third surface to the first surface, and wherein the display optical system satisfies the following conditions:

$0.62 \leq L12/f \leq 5.00$ $1.80 \leq L45/L12 \leq 5.00$ where, when a ray emitted from a center of an image forming area of the image forming element in which the original image is formed and passing through a center of the exit pupil is referred to as a central-view-angle principal ray, and a distance between hit points of the central-view-angle principal ray on the optical surfaces is referred to as a hit point distance, L45 represents a hit point distance between a position at which the light flux is refracted on the fifth surface and a position at which the light flux is reflected on the fourth surface, L12 represents a hit point distance between a position at which the light flux is reflected on the second surface and a position at which the light flux is refracted on the first surface, and f represents a focal length of the display optical system in a sectional view including optical paths of the central-view-angle principal ray between the optical surfaces of the optical element.

2. An image display apparatus according to claim 1, wherein the display optical system satisfies the following condition:

$0.48 \leq L45/L13 \leq 5.00$ where L13 represents a hit point distance between a position at which the light flux is reflected on the third surface and a position at which the light flux is reflected on the first surface.

3. An image display apparatus according to claim 1, wherein the second surface has a positive optical power.

4. An image display apparatus according to claim 1, wherein at least one of the first to fifth surfaces is a rotationally asymmetric surface.

5. An image display apparatus according to claim 1, wherein the first surface causes the light flux from the third surface to be internally totally reflected and causes the light flux from the second surface to be transmitted without causing the light flux to be internally totally reflected.

6. An image display apparatus according to claim 1, wherein an angle of view of the display optical system is 50° or larger.

7. An image capturing apparatus comprising:

an image sensor configured to capture an optical image of an object; and an image capturing optical system formed by an optical element whose inside surrounded by optical surfaces including a first surface, a second surface, a third surface, a fourth surface and a fifth surface is filled with an optical medium and configured to image a light flux from the object to form the optical image on the image sensor, wherein the image capturing optical system is configured to:

cause the light flux exiting from the object to be refracted on the first surface, reflected on the second surface, reflected on the first surface, reflected on the third surface and reflected on the fourth surface in this order and then cause the light flux to be refracted on the fifth surface and exit toward the image sensor;

cause the light flux to form an intermediate image inside the image capturing optical system; and cause at least part of an optical path of the light flux proceeding from the first surface to the third surface to intersect with at least part of an optical path of the light flux proceeding from the fourth surface to the fifth surface, and wherein the image capturing optical system satisfies the following conditions:

$0.62 \leq L12/f \leq 5.00$ $1.80 \leq L45/L12 \leq 5.00$ where, when a ray passing through a center of an entrance pupil and reaching a center of an image capturing area of the image sensor is referred to as a central-view-angle principal ray, and a distance between hit points of the central-view-angle principal ray on the optical surfaces is referred to as a hit point distance, L45 represents a hit point distance between a position at which the light flux is refracted on the fifth surface and a position at which the light flux is reflected on the fourth surface, L12 represents a hit point distance between a position at which the light flux is reflected on the second surface and a position at which the light flux is refracted on the first surface, and f represents a focal length of the image capturing optical system in a sectional view including optical paths of the central-view-angle principal ray between the optical surfaces of the optical element.

* * * * *